(No Model.) 2 Sheets—Sheet 1.
W. TATE & W. T. JOHNSON.
GRAIN AND SEED SEPARATOR AND GRADER.
No. 290,944. Patented Dec. 25, 1883.
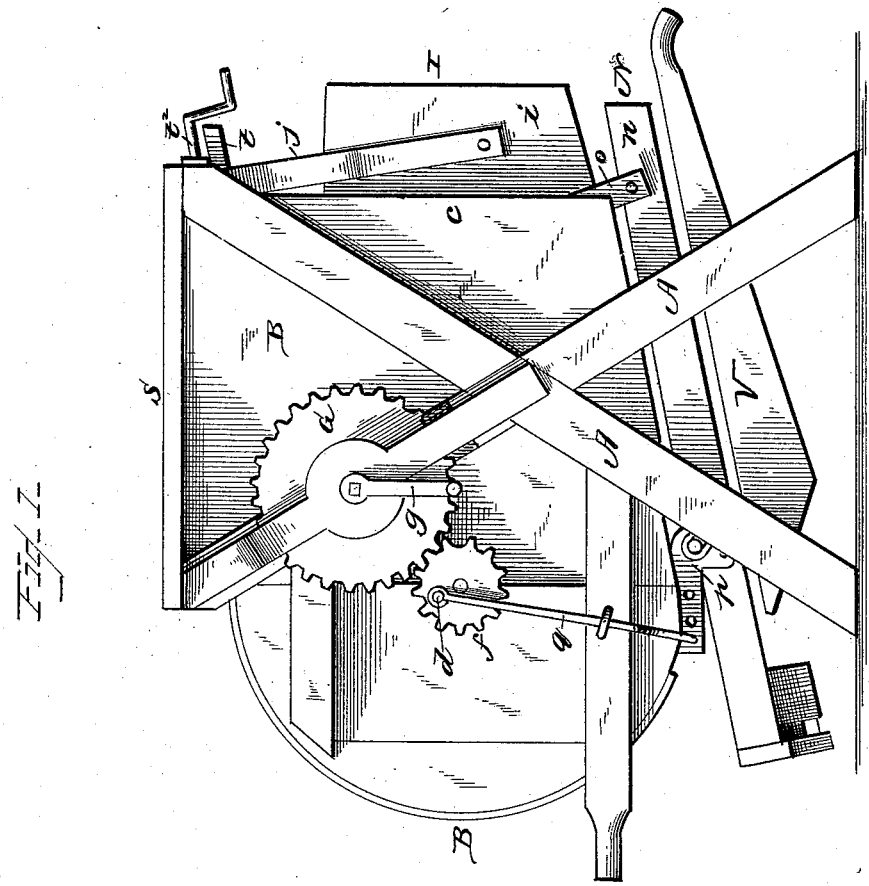
WITNESSES
F. L. Ourand
W. B. Hale
INVENTOR
William Tate
Wiley T. Johnson
By J. M. Yznaga,
Attorney (No Model.) 2 Sheets—Sheet 2.
W. TATE & W. T. JOHNSON.
GRAIN AND SEED SEPARATOR AND GRADER.
No. 290,944. Patented Dec. 25, 1883.
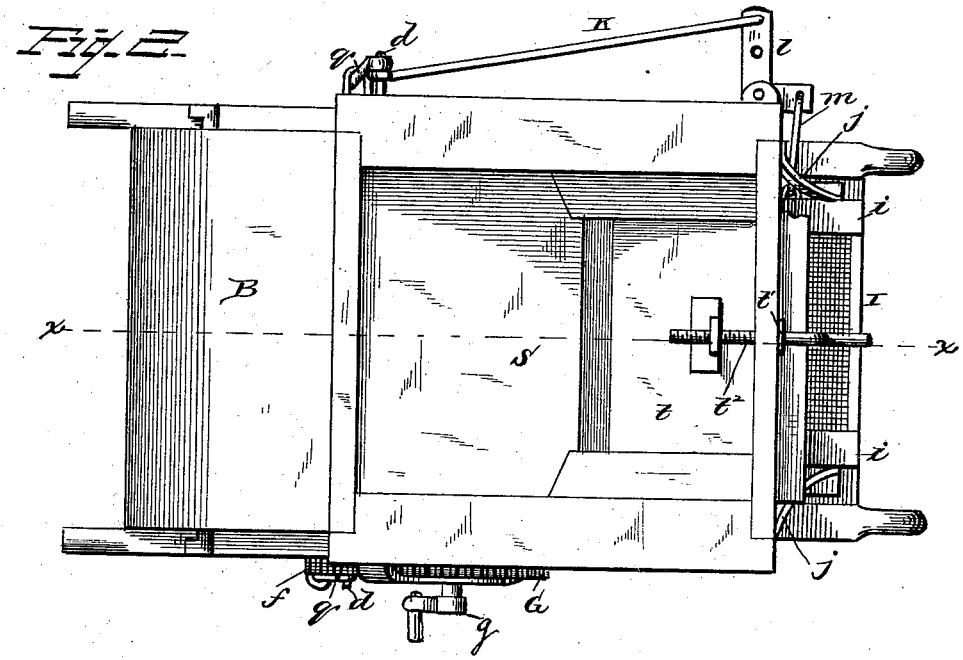
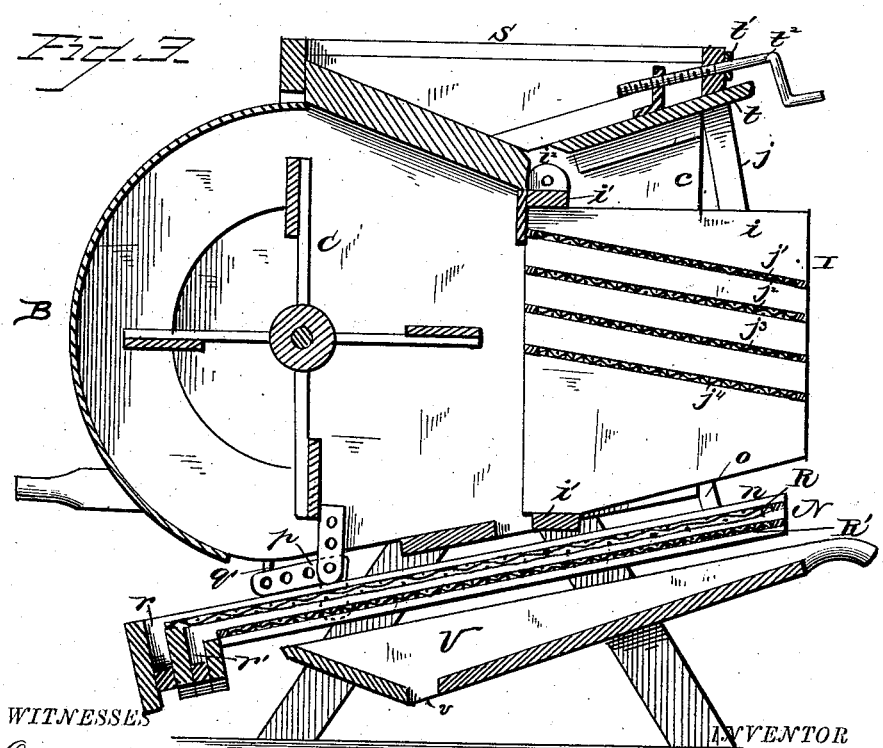
WITNESSES
F. L. Ourand
W. B. Hale
INVENTOR
William Tate
Wiley T. Johnson
by J. M. Yznaga, Attorney

United States Patent Office.

WILLIAM TATE AND WILEY T. JOHNSON, OF WINSTON, NORTH CAROLINA.

GRAIN AND SEED SEPARATOR AND GRADER.

SPECIFICATION forming part of Letters Patent No. 290,944, dated December 25, 1883.

Application filed October 25, 1883. (No model.)

*To all whom it may concern:*

Be it known that we, WILLIAM TATE and WILEY T. JOHNSON, citizens of the United States of America, residing at Winston, in the county of Forsyth and State of North Carolina, have invented certain new and useful Improvements in Grain and Seed Separators and Graders; and we do hereby declare the following to be a full, clear, and exact description of the invention, such as will enable others skilled in the art to which it appertains to make and use the same.

The object of our invention is to improve the operation of the grading and separating devices of seed separators and graders by giving the lower shoe, which carries the grading screens or sieves, a combined vertical and longitudinal jumping motion, which keeps thoroughly agitated the mass of seed and screenings or chaff passing over said screens, and, further, to provide for readily regulating the said motion of these screens to suit the condition and kind of seed being treated.

With this object in view our invention consists in certain novel combinations of parts hereinafter claimed, and which will be readily understood from the following particular description, in connection with the accompanying drawings, in which—

Figure 1 is a side elevation of our improved machine. Fig. 2 is a top view thereof, and Fig. 3 is a vertical section on the line $x\,x$ of Fig. 2.

A A indicate a frame, between the two sides of which is supported the fan-casing B, within which the fan C is shown in Fig. 3. The fan-shaft is supported in suitable bearings in the side walls of the casing, and projects beyond said walls on both sides, each projecting end of said shaft being provided with a crank, $d$, of slight throw.

Upon one projecting end of the fan-shaft is fixed a pinion, $f$, which gears with the cog-wheel G, mounted in suitable bearings on the outside of the fan-casing, and having its shaft provided with winch $g$, this cog-wheel being the main driver of the machine.

Between the rearwardly-extended walls $c$ of the fan-casing is mounted an upper shoe, I, which is composed of two side walls, $i$, projecting rearwardly beyond the fan-casing, while their inner ends stand close to the fan and are connected by cross-bars $i'$. At its inner end this shoe is loosely hung by ears $i^2$, through which project pins from the fan-casing wall, and at its outer end this shoe is supported by spring-arms $j$, the upper ends of which are attached to the top of the frame on opposite sides, while their lower ends are attached to the side walls of the shoe, respectively. The inner surfaces of the walls of this shoe are provided with longitudinal grooves, as shown at $j'$, $j^2$, $j^3$, and $j^4$, to receive screens upon which the grain or seed blown rearward by the fan may fall at different levels, this expedient being adopted in order to prevent the lighter grades of grain escaping with the chaff from the effect of a strong blast, while at the same time the real chaff is in the main carried off. To this upper shoe a laterally-shaking motion is imparted by means of a pitman, $k$, connected with one of the cranks of the fan-shaft and also with one arm of a bell-crank lever, $l$, pivoted in a bracket on one side of the fan-casing, and having its other arm connected by a link, $m$, with the shoe. Beneath this upper shoe is suspended a lower shoe, N, inclined downward toward the front or fan end of the machine. This lower shoe is composed of two side walls, $n$, having their rear ends suspended by links $o$, and their front ends pivoted to the downwardly-projecting arms of bell-crank levers $p$, pivoted to the frame of the machine, and having their forwardly-extended arms connected with the fan-shaft cranks by pitmen $q$. The inner surfaces of the walls of this lower shoe are each provided with two grooves or other supports for two screens, R and R', having different grades of meshes. The upper screen, R, extends to a spout, $r$, at the extreme forward end of the shoe, and inclining to one side thereof, while the lower screen, R', extends not quite so far forward, and terminates in another spout, $r'$, inclining in the opposite direction from the spout $r$, so that the grain delivered from these two screens, respectively, will be discharged in opposite directions, and is therefore easy of separate collection, and not liable to become mixed.

The action of the bell-crank levers $p$ is to give the lower shoe and screens R R' a combined vertical and longitudinal jumping motion, which rapidly shifts the mass of seed and chaff back and forth, and at the same time keeps it thoroughly loosened up, so that the separation and grading will be expeditious and complete.

Beneath the lower shoe is arranged the stationary screenings-box V, inclined downwardly toward the front of the machine, and having an opening, $v$, in its bottom, for the discharge of screenings to the rear of the two spouts of the lower shoe, N. This screenings-box extends rearwardly beyond the lower shoe in order that it may receive all the screenings passing through the sieves of said shoe.

At the top of the frame and immediately above the inner end of the upper shoe is arranged the feed-hopper S, the bottom walls of which incline downwardly toward each other, the rearward bottom wall, $t$, being arranged to slide in grooves or guides to or from its opposite wall, and being adjustable by means of a screw-shaft, $t'$, which takes into a screw-threaded lug projecting from said sliding wall, and is provided with an operating-crank to the rear of its bearings $t'$, in an upper cross-bar of the frame. By operating this screw-shaft, the sliding wall $t$ may be moved to cause an opening of greater or less extent at the bottom of the hopper, as may be desired, so that the feed of the grain may be regulated.

The operation of the apparatus is as follows: On rotating the driving-wheel G by means of its winch, rotary motion is imparted to the fan-shaft and fan, and at the same time, through the pitman $k$ and its connected bell-crank and link, a lateral vibrating motion is imparted to the upper shoe. Through the pitman connecting the fan-shaft cranks with the bell-crank levers of the lower shoe a longitudinal and at the same time slightly vertical vibratory motion is imparted to the lower shoe, N. As the grain is fed into the hopper and falls through the opening thereof, it is struck by the blast from the fan and carried rearwardly with the chaff, and while the lighter chaff is driven out through the rear open end of the shoe the grain will fall upon its sieves. The whole number of four sieves may be used at the same time, if desired, in the upper shoe; but when, from the nature of the grain being treated, it is observed that the chaff is passing off, one sieve may be arranged at the proper level to catch the grain, which will pass downwardly through the sieve or sieves, while the chaff which lodges on said sieve will be shaken up so as to come again under the efficient action of the blast and be gradually driven off. All the grain which passes through the sieve or sieves of the upper shoe falls on the upper sieve of the lower shoe, N, and the first grade of said grain, being fuller than the second grade, will be shaken down to the front and passed off through the forward spout, $r$, while the second grain and screenings will pass through the first sieve, R, and fall onto the lower sieve, R', the screenings passing through the sieve to the screenings-box, while marketable grain is shaken down to the second spout, $r'$, and passes off through said spout in an opposite direction to the first grade.

The efficient separation of the two grades of grain or seed depends very greatly upon the agitation and loosening of the ungraded mass, and the peculiar motion given to the lower shoe and its sieves effects the object in a highly satisfactory manner, as the range and force of the motion may be regulated to suit any kind or condition of grain or seed, this regulation being effected by shifting the connection-pins of the operating-pitmen to such holes in the rearwardly-projecting perforated arms of the shoe-supporting bell-crank levers as will give the desired movement.

We are aware that a separator and grader, as shown and described, and having the lower end of the lower shoe of a thrasher and separator, has been suspended by links or suspension-rods having arms projecting from points intermediate of their length, and provided with adjusting-holes for making connection with operating rods or pitmen, and we lay no claim to such construction.

Having now described our invention and explained the operation thereof, we claim—

The combination, with the casing, fan-shaft, fan, and upper vibratory shoe, of the lower shoe provided with the sieves R R', the swinging arms for supporting said shoe at its upper end, the bell-crank levers $p$, pivoted at their bends, and having downwardly-projecting arms pivoted to the lower shoe, and forwardly-projecting arms provided with adjusting-holes, the crank-rods $q$, crank-wheel $f$, and gear-wheel G, the whole constructed and arranged to operate substantially as described.

In testimony whereof we affix our signatures in presence of two witnesses.

WILLIAM TATE.
WILEY T. JOHNSON.

Witnesses:
  B. Y. RAYLE,
  N. S. COOK.